US008230221B2

(12) United States Patent
Haddad et al.

(10) Patent No.: US 8,230,221 B2
(45) Date of Patent: Jul. 24, 2012

(54) ROUTING ADVERTISEMENT AUTHENTICATION IN FAST ROUTER DISCOVERY

(75) Inventors: Wassim Haddad, Bromma (SE); Suresh Krishnan, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1761 days.

(21) Appl. No.: 11/494,547

(22) Filed: Jul. 28, 2006

(65) Prior Publication Data

US 2007/0036119 A1 Feb. 15, 2007

Related U.S. Application Data

(60) Provisional application No. 60/707,978, filed on Aug. 15, 2005.

(51) Int. Cl.
*H04L 29/06* (2006.01)
(52) U.S. Cl. ..................................... 713/170
(58) Field of Classification Search .................... 713/170
See application file for complete search history.

(56) References Cited

U.S. PATENT DOCUMENTS

| | | | | |
|---|---|---|---|---|
| 5,838,790 | A * | 11/1998 | McAuliffe et al. | 713/176 |
| 6,920,559 | B1 * | 7/2005 | Nessett et al. | 713/168 |
| 7,126,948 | B2 * | 10/2006 | Gooch et al. | 370/392 |
| 7,145,911 | B2 * | 12/2006 | Gooch | 370/395.32 |
| 7,383,577 | B2 * | 6/2008 | Hrastar et al. | 726/23 |
| 7,401,217 | B2 * | 7/2008 | Huang et al. | 713/153 |
| 7,461,251 | B2 * | 12/2008 | Oishi | 713/162 |
| 7,532,587 | B2 * | 5/2009 | Carbunar et al. | 370/254 |
| 7,636,845 | B2 * | 12/2009 | Jeon et al. | 713/171 |
| 7,656,840 | B2 * | 2/2010 | Krishnamurthi et al. | 370/331 |
| 7,706,776 | B2 * | 4/2010 | Zheng | 455/410 |
| 7,743,408 | B2 * | 6/2010 | Aboba et al. | 726/4 |
| 2003/0108052 | A1 * | 6/2003 | Inoue et al. | 370/399 |
| 2004/0103282 | A1 * | 5/2004 | Meier et al. | 713/171 |
| 2004/0236720 | A1 * | 11/2004 | Basso et al. | 707/1 |
| 2004/0240669 | A1 * | 12/2004 | Kempf et al. | 380/277 |
| 2004/0243846 | A1 * | 12/2004 | Aboba et al. | 713/201 |
| 2005/0004916 | A1 * | 1/2005 | Miller et al. | 707/10 |
| 2005/0078824 | A1 * | 4/2005 | Malinen et al. | 380/247 |
| 2006/0046713 | A1 * | 3/2006 | Yokota et al. | 455/426.1 |
| 2006/0173831 | A1 * | 8/2006 | Basso et al. | 707/3 |
| 2007/0140196 | A1 * | 6/2007 | Jeon et al. | 370/338 |
| 2008/0056136 | A1 * | 3/2008 | Carbunar et al. | 370/238 |

OTHER PUBLICATIONS

James Kempf et al., Securing IPv6 Neighbor Discovery Using Address Based Keys (ABKs), Internet Draft, Jun. 2002.
PCT Search Report dated Feb. 22, 2007 from corresponding application PCT/IB2006/052636.
JinHyeock Choi et al., Fast Router Discovery with RA Caching, DNA WG, Internet-Draft, Jul. 12, 2004.
T. Narten et al., Neighbor Discovery for IP Version 6 (IPv6), Network Working Group, RFC 2461, Dec. 1998.

* cited by examiner

*Primary Examiner* — David García Cervetti

(57) ABSTRACT

A method and a Mobile Node are provided for authenticating an Advertisement message received from an Access Router through an Access Point. The Advertisement message comprises a Hashed Nonce Value and a Nonce Index corresponding to a Nonce Value held in the Access Router. Upon receiving the Advertisement message from the Access Point, the Mobile Node initiates a process for configuring an IP address, by use of information received in the Advertisement, for having a session with the Access Point and the Access Router. In parallel, either the Access Point or the Mobile Node sends the Nonce Index directly to the Access Router. The Access Router replies with the Nonce Value sent to the Mobile Node. The Mobile Node hashes the Nonce Value received from the Access Router and compares a Result of the hashing with the Hashed Nonce Value. If the Result matches the Hashed Nonce Value, the Advertisement is considered authenticated and the IP address configured according to the Advertisement is kept in the Mobile Node.

23 Claims, 4 Drawing Sheets

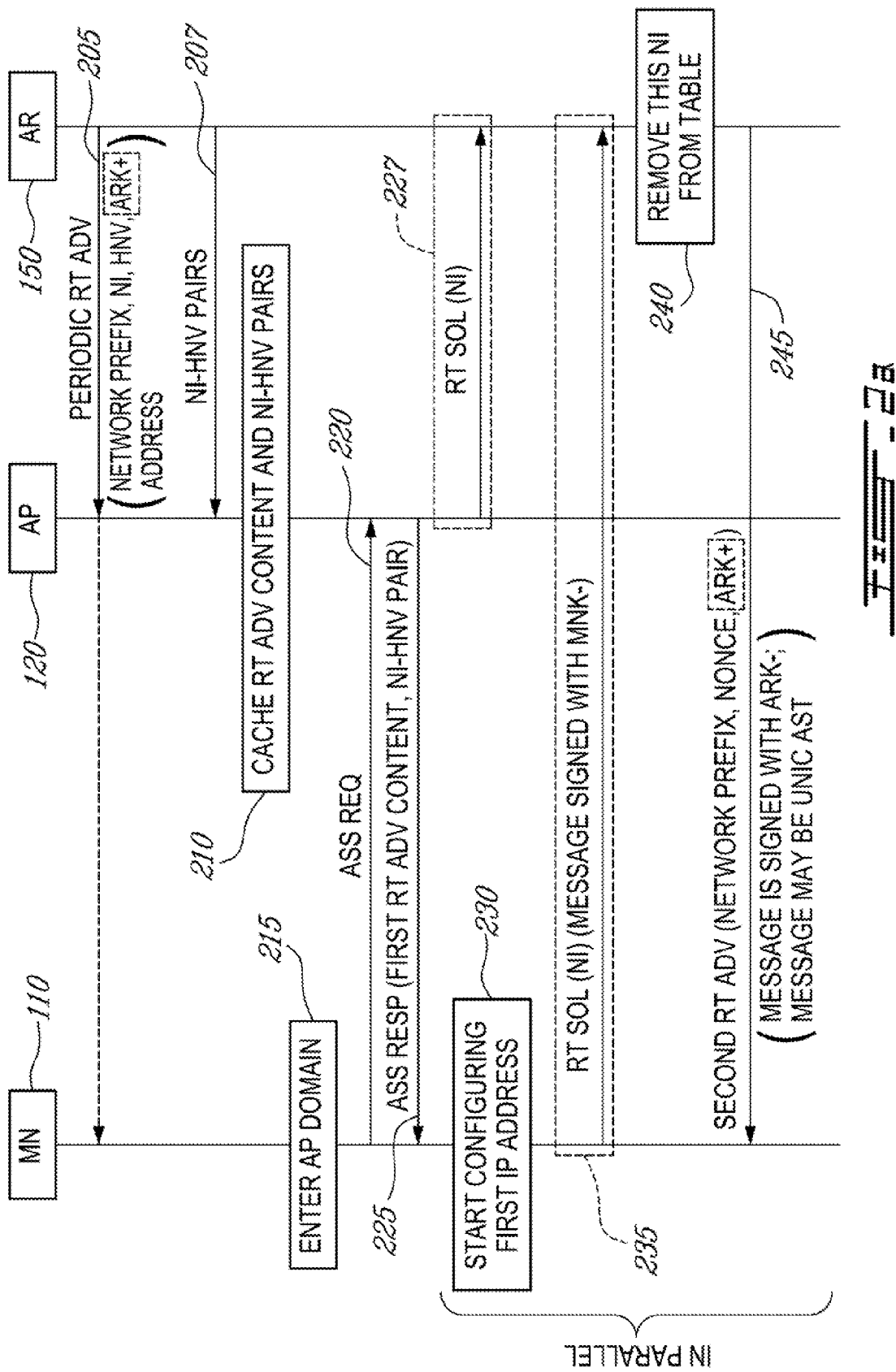

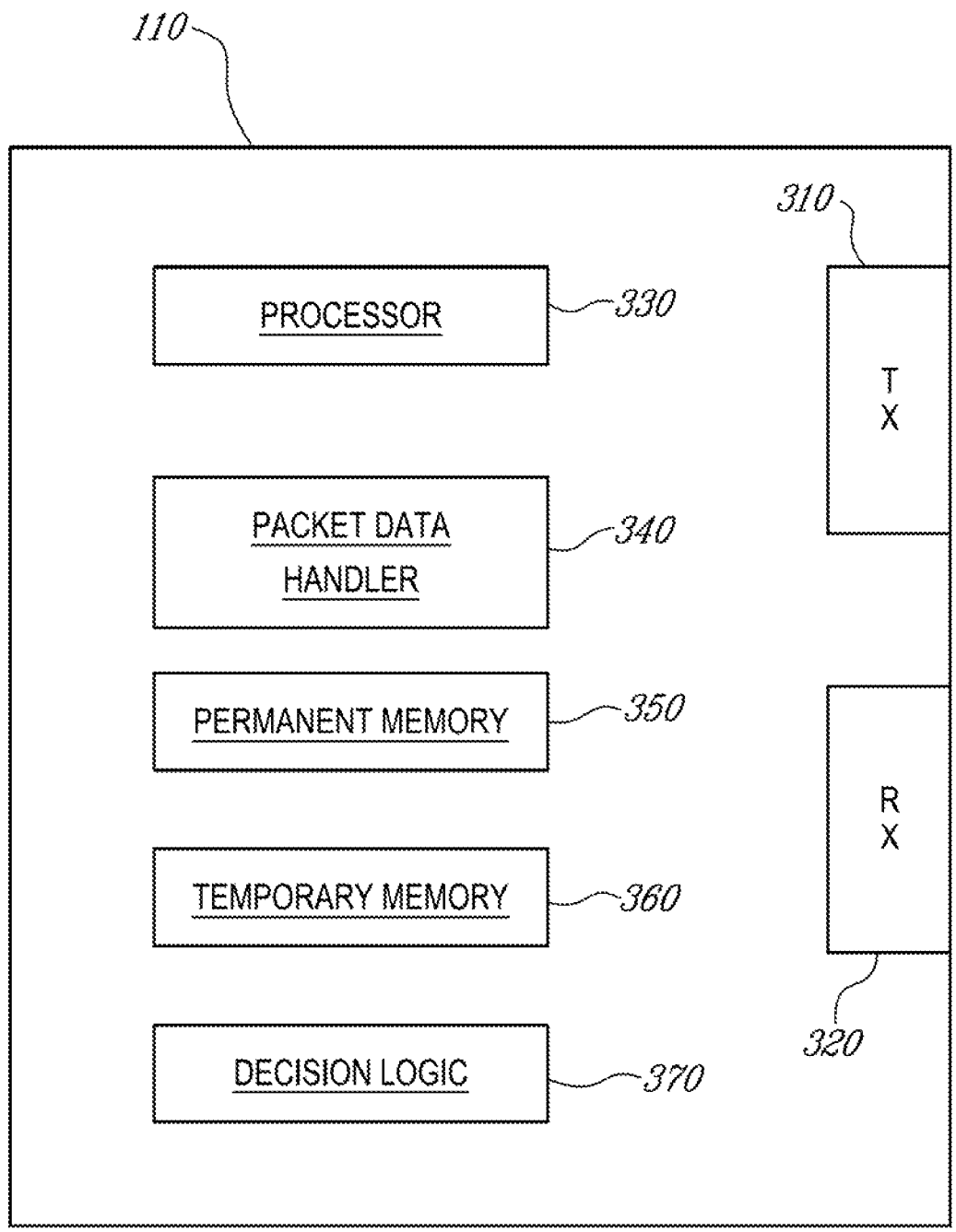

ROUTING ADVERTISEMENT AUTHENTICATION IN FAST ROUTER DISCOVERY

PRIORITY STATEMENT UNDER 35 U.S.C. S. 119(e) & 37 C.F.R. S. 1.78

This non-provisional patent application claims priority based upon the prior U.S. provisional patent application entitled "Proposal to secure the fast route discovery (FRD)", application No. 60/707,978, filed Aug. 15, 2005, in the name of Wassim Haddad and Suresh Krishnan.

BACKGROUND OF THE INVENTION

1. Field of the Invention

The present invention relates to a method and a Mobile Node, for supporting authentication of a Routing Advertisement message received directly from an Access Point.

2. Description of the Related Art

When a Mobile Node (MN) enters the domain of a new Access Point (AP), it must configure a new Internet Protocol (IP) address, usually consisting of an Internet Protocol version 6 (IPv6) address, in order to communicate with an Internet network through this AP. To achieve this, the MN needs to receive, from an Access Router (AR) linked to the AP, a Routing Advertisement (RtAdv) message comprising Network Prefixes that the MN uses to configure the new IP address. Only when the new IP address has been fully configured, the MN may start packet data communication with the Internet network.

Configuration of the IP address is a lengthy process. Firstly, though the AR sends periodic RtAdv messages, usually in Multicast fashion, it is not authorized to send such messages at a higher rate than once every three (3) seconds (RFC2461, "Neighbor Discovery for IP Version 6 (IPv6)", T. Narten, E. Nordmark, W. Simpson, IETF, December 1998). Secondly, in order to prevent different Mobile Nodes, or other clients, from acquiring the same IP address and disrupting each others' communication, the MN must, as a part of the IP configuration process, initiate a Duplicate Address Detection (DAD) procedure. The DAD procedure introduces large delays, on the order of one (1) second, in the IP address acquisition process. Delays introduced by the low periodicity of the Routing Advertisement messages and by the DAD procedure become critical during handoff since they add an undesirable latency. This latency is especially harmful when the Mobile Node (MN) is running time sensitive applications.

The Fast Router Discovery (FRD) proposal ("Fast Router Discovery with RA Caching", draft-jinchoi-dna-frd-00.txt, JinHyeock. Choi, DongYun. Shin, IETF, Jul. 12, 2004) aims to minimize the compulsory delay, as described in RFC2461, which prevents the MN from receiving a RtAdv from a new AR immediately after moving to a new link. For this purpose, the Fast Router Discovery (FRD) consists on caching a content of RtAdv message(s) in the AP. When the MN enters the domain of a given AP, it sends towards the AP an Association Request message. Because the AP has cached the content of the RtAdv messages, it then forwards this content in parallel with sending an Association Response message to the MN. This enables the MN to start the process of configuring its IP address without waiting for a periodic RtAdv.

The main threat in the above scenario consists on caching a fake RtAdv message in a malicious AP, which allows launching an easy Denial of Service (DoS) attack against the MN.

There would be clear advantages of having a method and a Mobile Node for allowing verification of the validity of a Routing Advertisement message received directly from an Access Point, in the context of Fast Router Discovery technology.

SUMMARY OF THE INVENTION

It is therefore a broad object of this invention to provide a method and a Mobile Node (MN) to allow providing the MN with a certain level of trust that a Routing Advertisement (RtAdv) message cached in an Access Point (AP) belongs to a legitimate Access Router (AR).

A first aspect of the present invention is directed to a method of authenticating in an MN a first Advertisement received from an AP, the Advertisement representing data received from an AR and cached in the AP. The Advertisement comprises a Network Prefix required by the MN for setting up an Internet Protocol (IP) address. The Advertisement further comprises a Nonce Index and a Hashed Nonce Value. The MN starts a process of setting up the IP address immediately after receiving the first Advertisement from the AP. In parallel, it sends a Solicitation, which includes the Nonce Index, to the Access Router. While the process of setting up the IP address is underway, the MN receives a second Advertisement comprising a Nonce Value. The MN hashes the Nonce Value and compares a Result of the hashing with the Hashed Nonce Value. If the comparison is successful, the MN keeps the IP address.

A second aspect of the present invention is directed to the method of authenticating in MN the first Advertisement received from the AP wherein, when the comparison of the Hashed Nonce Value with the Result of hashing the Nonce Value at the MN is unsuccessful, the MN drops the IP address and initiates setting up of a new IP address by use of a Network Prefix received in the second Advertisement.

A third aspect of the present invention is directed to the method of authenticating in MN the first Advertisement received from the AP wherein the MN and the AR use Cryptographically Generated Address (CGA) keys to further authenticate the Advertisements and the Solicitation.

A fourth aspect of the present invention is directed to a MN for authenticating a first Advertisement received from an AP, the Advertisement representing data received from an AR and cached in the AP. The Mobile Node comprises a Receiver for receiving Advertisements, a Temporary Memory for storing information elements received in the Advertisements and for storing an IP address, a Transmitter for sending a Solicitation, a Processor for configuring the IP address and for hashing a Nonce Value received in the Advertisements, and a Decision Logic. The Processor configures the IP address based on a Network Prefix received in a first Advertisement. Meanwhile, the transmitter sends the Solicitation comprising a Nonce Index received in the first Advertisement. The Receiver receives a second Advertisement comprising the Nonce Value. The Processor hashes the Nonce Value. The Decision Logic compares a Result of the hashing with a Hashed Nonce Value received in the first Advertisement. The Decision Logic decides to keep the IP Address, provided that the comparison is positive.

BRIEF DESCRIPTION OF THE DRAWINGS

For a more detailed understanding of the invention, for further objects and advantages thereof, reference can now be made to the following description, taken in conjunction with the accompanying drawings, in which:

FIGS. 2a and 2b show an exemplary representation of a method to authenticate an Advertisement received at a Mobile Node from an Access Point; and FIG. 3 shows an exemplary Mobile Node built according to the present invention.

DETAILED DESCRIPTION

Figure 1:
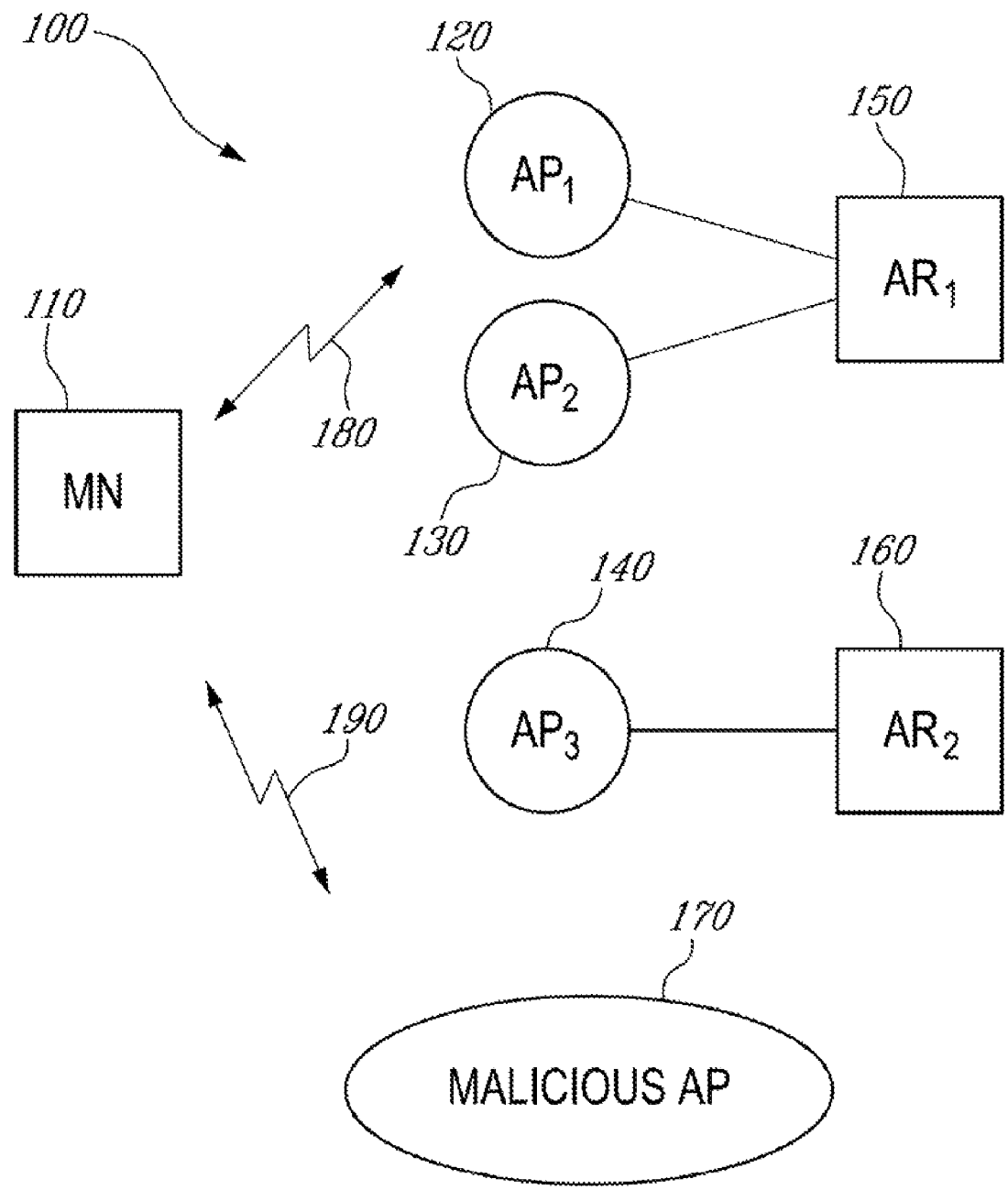
FIG. 1 is a representation of partial Mobile IPv6 network.

The innovative teachings of the present invention will be described with particular reference to various exemplary uses and aspects of the preferred embodiment. However, it should be understood that this embodiment provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the invention.

The present invention provides a method and a Mobile Node (MN) to support a Fast Router Discovery (FRD) method in which a content of periodic Advertisements sent from Access Routers (AR), for example periodic Routing Advertisement (RtAdv) messages, are cached in Access Points (AP). When the MN enters a domain, or coverage area, of a given AP, it sends towards the AP an Association Request (AssReq) message. According to the FRD method, the AP responds to the AssReq by sending an Association Response (AssResp) along with information elements, forming the content of a RtAdv, previously cached in the AP. The RtAdv provided to the MN by the AP may be sent either as a part of the AssResp or may be sent in parallel with the AssResp. In order to provide a means to the MN for authenticating that the RtAdv provided by the AP is legitimate, the periodic RtAdv sent by the AR and cached in the AP comprises, according to the present invention, authentication values. The authentication values preferably consist of a Nonce Index and a Hashed Nonce Value; the Hashed Nonce Value having been produced in the AR by hashing a Nonce Value that may be addressed in a table of the AR by use of the Nonce Index. A Nonce is defined herein as a number that is used only once. As soon as it receives the RtAdv, the MN initiates a procedure for configuring an IP address, as per the FRD method. In parallel with this configuration process, and in order to verify that the RtAdv received from the AP is legitimate, the MN sends a Solicitation towards the AR. In the Solicitation, according to the present invention, the MN includes the Nonce Index. The AR receives the Nonce Index and fetches the corresponding Nonce Value. The AR sends the Nonce Value towards the MN in a new RtAdv. As the MN receives this new RtAdv, it hashes the Nonce Value and compares a Result of this hashing with the Hashed Nonce Value it had received with the earlier RtAdv. If the two hashed values are equal, it means that the earlier RtAdv it had received was from this AR, and not a result of malicious information sent by the AP. Whether or not the process of configuring the IP address is completed at this time, the MN considers that the resulting IP address will be valid.

In the context of the present invention, the MN may comprise a mobile cellular telephone, a personal digital assistant, a laptop computer and the like. The AP may comprise an IEEE 802.11 Access Point, an IEEE 802.16 Point of Access, and the like. The AP and the AR may be implemented in a single apparatus or as distinct elements connected by a communications link.

In order to provide a basis for a description of the preferred embodiment of the present invention, reference is now made to the Drawings in which FIG. 1 shows a representation of partial Mobile IPv6 (MIPv6) network 100. The MIPv6 network 100 comprises a Mobile Node (MN) 110, Access Points (AP) 120, 130 and 140, and Access Routers (AR) 150 and 160. One AR may be connected to one or to many AP. Those of ordinary skills in the art will recognize that the MIPv6 network 100 would normally comprise a large number of MN 110. The MN 110 only communicates through the AP 120, 130 or 140, but a message sent by the MN 110 may be intended either for the AP 120, 130 or 140, or for the AR 150 or 160. The AR 150 and 160 periodically send RtAdv messages to enable any MN 110 to configure an IP address. The RtAdv messages are sent to the MN 110 through the AP 120, 130 and 140. According to the FRD method, the AP 120, 130 and 140 are capable of keeping a copy of the RtAdv content in their caches.

When the MN 100 enters the domain, or coverage area, of some of the AP 120, 130 or 140, it sends an AssReq on a Path 180 to a selected one of the AP 120, 130 or 140, requesting the set-up of a session. If the AP 120, 130 or 140 is FRD-capable, it includes in an AssResp sent to the MN 110 a content of a recently cached RtAdv. The content of the RtAdv is received in the MN 110 via the path 180, generally faster than an eventual periodic RtAdv sent directly by the AR 150 or 160. This enables the MN 110 to immediately start configuration of an IP address for communicating with the AR 150 or 160.

As it happens too frequently, a Malicious AP 170 may be present in the MIPv6 network 100 of FIG. 1. If, instead of accessing one of the legitimate AP 120, 130 or 140, the MN 110 accesses the Malicious AP 170, it sends an AssReq on path 190. The Malicious AP 170 responds with an AssResp comprising fraudulent RtAdv information. The MN 110 then configures an invalid IP address based on the fraudulent information. The MN 110 may then attempt to set up a session with the invalid IP address, based on a belief that the session is legitimate. The Malicious AP 170 may use the session to cause harm to the MN 110 or to its user by, for example, sending a virus to the MN 110 or retrieving confidential information from the MN 110.

Figure 2B:
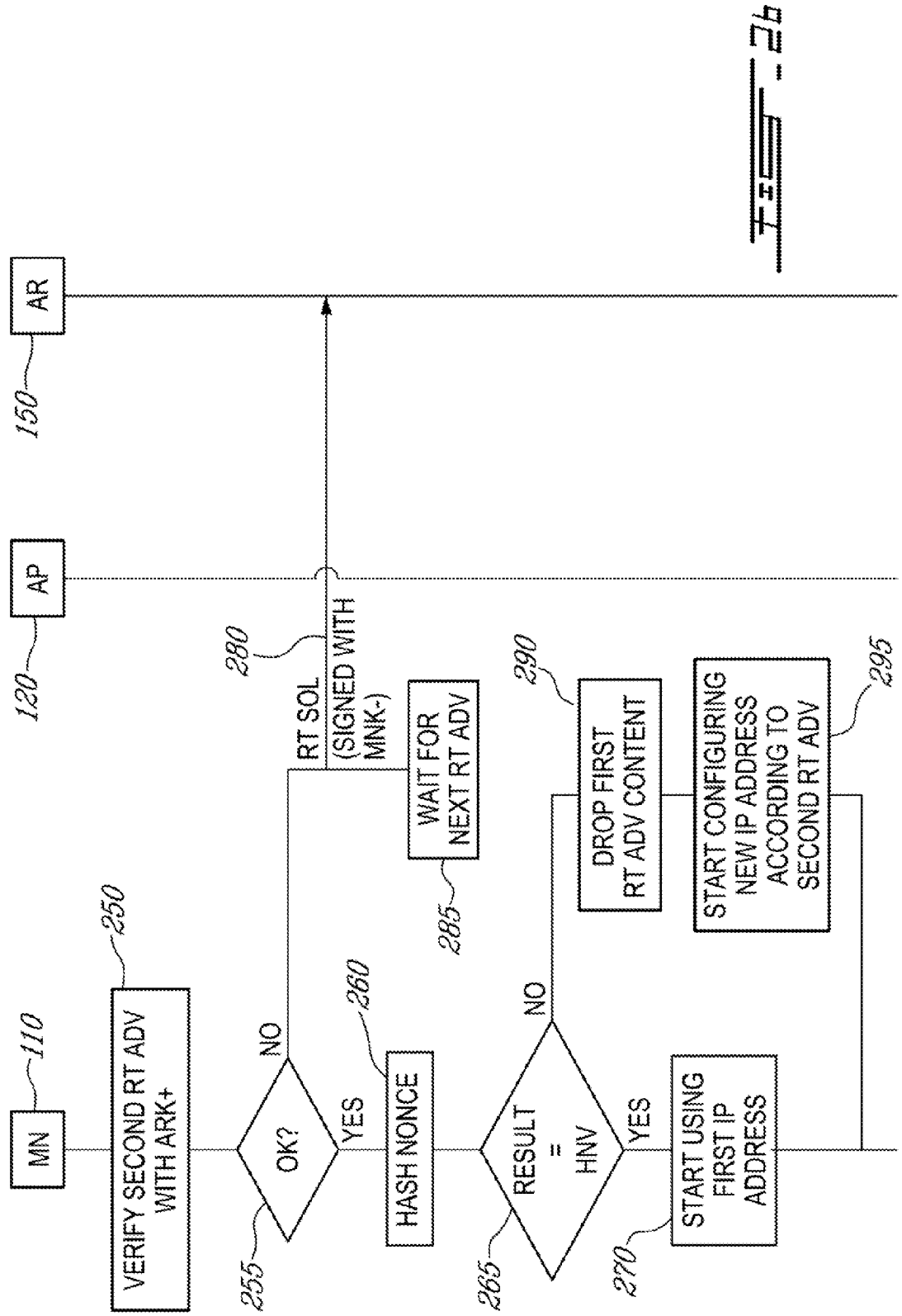

Having now described hereinabove a context of an MIPv6 network supporting the FRD method, an aspect of the preferred embodiment of the present invention will now be described by reference to FIGS. 2a and 2b which show an exemplary representation of a method to authenticate an Advertisement received at a Mobile Node from an Access Point. The MN 110, the AP 120 and the AR 150 of FIGS. 2a and 2b are all built according to the teachings of the present invention.

At step 205, the AR 150 periodically sends Advertisements, such as Routing Advertisement (RtAdv) messages, through the AP 120, at a rate not exceeding once per three (3) seconds. The RtAdv messages are multicasted and intended for all terminals, such as user portable devices, that may be in the coverage of the AP 120. The RtAdv comprises information in the form of a Network Prefix of the AR 150, a Nonce Index (NI), a Hashed Nonce Value (HNV), an address of the AR 150 and, optionally, a Public Key of the AR (ARK+). In a preferred embodiment of the present invention, the ARK+ is a Cryptographically Generated Address (CGA) key. If at step 205 a given MN 110 is already under the coverage of the AP 120, it receives the periodic RtAdv. Optionally, the AR 150 may also send to the AP 120, at higher rate, further NI-HNV pairs at step 207. The AP 120 caches the information from the periodic RtAdv 205 as well as the optional further NI-HNV pairs 207 in its internal memory at step 210.

At step 215, another MN 110 that did not earlier receive a periodic RtAdv message enters the coverage, or domain, of the AP 120. In order to set up a session, it sends at step 220 an Association Request (AssReq) message to the AP 120, to request setting up a connection. At step 225, the AP 120 replies with an Association Response (AssResp). The AssResp comprises all information it has recently cached for the RtAdv, including a given NI-HNV pair which preferably is one of many NI-HNV pairs currently cached in the AP 120. Alternatively, the AP 120 may send the AssResp and the RtAdv sequentially, as two distinct messages, within a very brief period. Optionally, the AP 120 may, at step 227, send a Solicitation to the AR 150, for example a Route Solicitation (RtSol) message, on behalf of the MN 110. This RtSol message, if sent at this step, will trigger sending, by the AR 150, of another RtAdv message to the MN 110, as is described hereinbelow. If the AP 120 is configured for sending the RtSol message, it includes a parameter to inform the MN 110 of this fact in the AssResp sent at step 225.

Returning to step 225, the MN 110 having received a first RtAdv content stores the HNV, which is a first HNV for the session, the NI, the Network Prefix, the address of the AR 150, and the ARK+ if provided. The MN 110 can start configuring an IP address, for example an IPv6 address, at step 230, using the Network Prefix of the AR 150. Because the process of configuring the IP address, possibly including a Duplicate Address Detection (DAD) procedure, typically takes more than one second, and because an eventual periodic RtAdv, obtained directly from the AR 150, might not be received until after a three-second delay, or even later, initiating the IP address configuration process already at step 230 greatly saves time and favours rapid set up of delay sensitive applications by the MN 110. At this point, however, the MN 110 does not have any proof of the legitimacy of the RtAdv content.

In order to authenticate the RtAdv content while the IP address configuration process is underway, the MN 110 may send at step 235 a Solicitation to the AR 150, for example a Route Solicitation (RtSol) message. In an alternate embodiment, the AP 120 may have already sent the RtSol message at step 227, on behalf of the MN 110, as described hereinabove. In any case, the RtSol message, whether sent by the AP 120 at step 227 or by the MN 110 at step 235, comprises the NI that was provided by the AR 150 in the periodic RtAdv, at step 205. The RtSol message is preferably sent in Unicast by use of the address of the AR 150. The RtSol message is optionally signed with a Private Key of the MN (MNK−). In a preferred embodiment of the present invention, the MNK− is a Cryptographically Generated Address (CGA) key.

At step 240, the AR 150 preferably removes the NI and a corresponding Nonce Value from an internal table, in order to force that future RtAdv use a different NI-HNV pair. At step 245, the AR 150 responds to the MN 110 with another RtAdv, which is a second RtAdv arriving at the MN 110. This second RtAdv also comprises the Network Prefix of the AR 150. It further comprises the Nonce Value that corresponds to the NI. It also preferably comprises the ARK+ of the AR 150. In a best mode of the present invention, the second RtAdv is Unicast and is signed by use of a Private Key of the AR 150 (ARK−).

Optionally, at step 250, the MN 110 makes a first verification of the validity of the second RtAdv by use of the ARK+. If the verification fails at step 255, the MN 110 sends a new RtSol message in Multicast at step 280. The MN 110 then waits at step 285 for a next periodic RtAdv. The MN 110 will eventually receive a periodic RtAdv comprising a Network Prefix of the AR 150, and configure a new IP address accordingly.

If the verification is successful at step 255, the MN 110 has authenticated the second RtAdv. The MN 110 hashes the Nonce Value at step 260, to obtain a second HNV. At step 265, the MN 110 compares the first and second HNV. If these are identical, the MN 110 has now authenticated the first RtAdv. It may start using the IP address at step 270 for sending and receiving data packets either immediately, or soon thereafter when the IP address configuration process, which is running in parallel with the authentication process, is completed. If however the first and second HNV values are not identical, at step 265, the MN 110 has not authenticated the first RtAdv. It drops all content previously stored for the first RtAdv at step 290. It starts configuring, at step 295, a new IP address by use of the Network Prefix received from the AR 150 in the second RtAdv. At the end of the process of step 295, the MN 110 will be able to use the new IP address for sending and receiving data packets.

Those skilled in the art will readily see from the foregoing description that the method of the present invention provides a means for the MN 110 to obtain a valid IP address more rapidly than in a traditional MIPv6 network, in a safer way than with the FRD method alone.

An exemplary construction of a Mobile Node used in the preceding description, will now be described by reference to FIG. 3, which shows an exemplary MN 110. The MN 110 comprises a Transmitter (TX) 310, a Receiver (RX) 320, a Processor 330, a Packet Data Handler 340, a Permanent Memory 350, a Temporary Memory 360 and a Decision Logic 370. The MN 110 may also comprise more elements such as a display, an antenna, a keypad, a battery, etc. as is well known in the art.

The Permanent Memory 350 stores a Public Key of the Mobile Node (MNK+) and a Private Key of the Mobile Node (MNK−). The Permanent Memory 350 further stores other data such as, for example, a permanent identity of the MN 110, as is well known in the art.

The TX 310 sends messages directly to Access Points, and to Access Routers through Access Points. These messages comprise AssReq, RtSol, as well as packet data. Specifically, the RtSol message sent by the TX 310 may be a Unicast RtSol message sent to a specific address, or a Multicast RtSol message.

The RX 320 receives messages directly from Access Points and from Access Routers through Access Points. These messages comprise AssResp, RtAdv, as well as packet data. Specifically, the RtAdv received by the RX 320 may be a Unicast RtAdv or a Multicast periodic RtAdv.

The Temporary Memory 360 stores information related to an ongoing session with an AP and an AR. Such information comprises a NI, a first HNV, a Nonce Value, a Network Prefix, an address of the AR, an ARK+, an IP address and other data required for having the session. The Temporary Memory 350 may, upon request from the Decision Logic 370 or from the Processor 330, overwrite information with other like information.

The Processor 330 executes a process for setting up an IP address, for example an IPv6 address, for the session with the AP and the AR, by use of the Network Prefix. The process of setting up the IP address preferably comprises a DAD procedure. The Processor 330 may execute the IP set-up process as many times as requested by the Decision 370 in the same session. When the Processor 330 executes the IP set-up process as a result of receiving the AssResp by the RX 320, it preferably initiates this IP set-up process concurrently with a process for authenticating a first Advertisement. The Processor 330 also has a hashing capability used to hash the Nonce Value and to provide, as a result of this hashing of the Nonce Value, a second HNV to the Decision Logic 370. The Processor 330 further has a verification capability for verifying a signature of the RtAdv message with the ARK+, and a signature capability for signing the RtSol message with the MNK−. The verification and signature capabilities are preferably of the CGA type.

The Decision Logic 370 determines, based on information received by the RX 320 in the AssResp, whether or not a Solicitation shall be sent by the TX 310. Alternatively, this feature may not be implemented in the Decision Logic 370 and the Solicitation may always be sent by the TX 310. The Decision Logic 370 makes a comparison of the first HNV obtained from the RtAdv message with the second HNV obtained from the Processor 330. The Decision Logic 370 decides, based on this comparison, whether or not the first Advertisement is authenticated and, consequently, decides either to keep the IP address, or to release the IP address and to order the Processor 330 to set up a new IP address. The Decision Logic 370 can also decide to keep or release the IP address based on a successful or failed signature verification of the RtAdv message.

The Packet Data Handler 340, when the Decision Logic 370 has decided to keep the IP address, receives packet data from the RX 320 and forwards it to applications in the MN 110. The Packet Data Handler 340 then also receives packet data from applications and forwards it to the TX 310.

Although several aspects of the preferred embodiment of the method and of the Mobile Node of the present invention have been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method of authenticating in a Mobile Node a first Advertisement received from an Access Point, the method comprising the steps of:
   receiving at the Mobile Node from the Access Point the first Advertisement comprising a first Network Prefix, a Nonce Index and a first Hashed Nonce Value;
   configuring at the Mobile Node a first IP address by use of the first Network Prefix, and concurrently authenticating the first Advertisement by:
      receiving at the Mobile Node from an Access Router a second Advertisement, the second Advertisement comprising a Nonce Value corresponding to the Nonce Index and a second Network Prefix;
      hashing at the Mobile Node the Nonce Value to calculate a second Hashed Nonce Value; and
      comparing at the Mobile Node the first Hashed Nonce Value and the second Hashed Nonce Value; and keeping at the Mobile Node the first IP address if the first Hashed Nonce Value is equal to the second Hashed Nonce Value.

2. The method of claim 1, further comprising the steps of:
   if the first Hashed Nonce Value is not equal to the second Hashed Nonce Value, dropping at the Mobile Node a content of the first Advertisement; and
   configuring at the Mobile Node a second IP address by use of the second Network Prefix contained in the second Advertisement.

3. The method of claim 1, wherein: at least one of the first and second Advertisement further comprises a Public Key of the Access Router.

4. The method of claim 3, further comprising the steps of:
   verifying at the Mobile Node the second Advertisement by use of the Public Key of the Access Router; and
   if the verification of the second Advertisement fails:
      sending from the Mobile Node towards the Access Router a Solicitation; and
      waiting at the Mobile Node for a Periodic Advertisement.

5. The method of claim 1, wherein: the second Advertisement is Unicast.

6. The method of claim 1, further comprising the step of: receiving at the Mobile Node Periodic Advertisements.

7. The method of claim 1, wherein: authenticating the first Advertisement further comprises the step of, responsive to receiving at the Mobile Node the first Advertisement, sending from the Mobile Node towards the Access Router a Solicitation comprising the Nonce Index.

8. The method of claim 7, wherein: the Solicitation is signed with a Private Key of the Mobile Node.

9. The method of claim 1, wherein: the first Advertisement is sent in parallel to an Association Response sent by the Access Point.

10. The method of claim 9, wherein: the Association Response is sent in response to an Association Request sent by the Mobile Node towards the Access Point.

11. The method of claim 1, further comprising the step of after the step of keeping at the Mobile Node the first IP address, starting at the Mobile Node Data Packet Exchange.

12. The method of claim 1, wherein: configuring at the Mobile Node the first IP address by use of the first Network Prefix comprises a Duplicate Address Detection procedure.

13. A Mobile Node, comprising:
   a Receiver for receiving a first and a second Advertisements;
   a Temporary Memory for storing a Network Prefix, a Nonce Index and a Hashed Nonce Value received in the first Advertisement, for storing a Nonce Value received in the second Advertisement, and for storing a first IP address,
   a Processor for configuring the first IP address based on the Network Prefix, the configuring being initiated concurrently with authenticating the first Advertisement, and for hashing the Nonce Value; and
   a Decision Logic for authenticating the first Advertisement by comparing a Result of the hashing with the Hashed Nonce Value and for deciding to keep the first IP address based on an outcome of the comparison.

14. The Mobile Node of claim 13, wherein:
   the Decision Logic is further for releasing the first IP address if the outcome of the comparison is negative;
   the Processor is further for configuring a second IP address based on the second Advertisement if the Decision Logic releases the first IP address; and
   the Temporary Memory is for further overwriting the first IP address with the second IP address.

15. The Mobile Node of claim 13, wherein:
   the Temporary Memory is further for storing a Public Key of an Access Router received in one of the first or second Advertisements;
   the Processor is further for verifying a signature of the second Advertisement by use of the Public Key of the Access Router; and
   the Decision Logic is further for deciding to keep the first IP address based on an outcome of the verification.

16. The Mobile Node of claim 15, wherein:
the Decision Logic is further for releasing the first IP address if the outcome of the verification is negative; and
the Mobile Node further comprises a Transmitter for sending a Solicitation when the Decision Logic determines that the outcome of the verification is negative.

17. The Mobile Node of claim 13, further comprising: a Permanent Memory for storing a Private Key of the Mobile Node.

18. The Mobile Node of claim 17, wherein: the Processor is further for signing the Solicitation with the Private Key of the Mobile Node.

19. The Mobile Node of claim 13, further comprising: a Transmitter for sending a Solicitation comprising the Nonce Index.

20. The Mobile Node of claim 19, further comprising: a Packet data Handler for handling sending and receiving of packet data when the Decision Logic decides to keep the first IP address.

21. The Mobile Node of claim 20, wherein: the Transmitter is further for sending packet data; and the Receiver is further for receiving packet data.

22. The Mobile Node of claim 13, wherein: the Processor is further for using a Duplicate Address Detection procedure as a part of configuring the first IP address.

23. The Mobile Node of claim 13, wherein: the Receiver is further for receiving Unicast Advertisements and Periodic Advertisements; and the second Advertisement is a Unicast Advertisement.

* * * * *